United States Patent [19]

Scholz

[11] 4,110,773
[45] Aug. 29, 1978

[54] BRAKE SYSTEM FOR FOCAL PLANE SHUTTERS OF PHOTOGRAPHIC CAMERAS

[75] Inventor: Erwin Scholz, Brunswick, Fed. Rep. of Germany

[73] Assignee: Rollei-Werke Franke & Heidecke, Brunswick, Fed. Rep. of Germany

[21] Appl. No.: 815,368

[22] Filed: Jul. 13, 1977

[30] Foreign Application Priority Data

Jul. 22, 1976 [DE] Fed. Rep. of Germany ....... 2632944

[51] Int. Cl.² .............................................. G03B 9/08
[52] U.S. Cl. .................................... 354/252; 354/226
[58] Field of Search ............... 354/226, 252, 256, 267, 354/202

[56] References Cited

U.S. PATENT DOCUMENTS 2,295,812 9/1942 Strassenburg ........................ 354/252
2,878,735 3/1959 Willcox ................................ 354/252

Primary Examiner—Michael L. Gellner
Attorney, Agent, or Firm—Stonebraker, Shepard & Stephens

[57] ABSTRACT

A focal plane shutter for a photographic camera has a brake system for braking the movement of shutter elements just before they reach their end or stop positions. At least one first brake element has a nearly constant braking torque, and at least one second brake element has a braking torque that increases over the distance of the braking movement. The constant and the increasing braking torques of the first and second braking elements are combined and applied to moving elements of the shutter, and both the constant and the increasing braking torques of the first and second brake elements are independently adjustable and settable.

15 Claims, 7 Drawing Figures

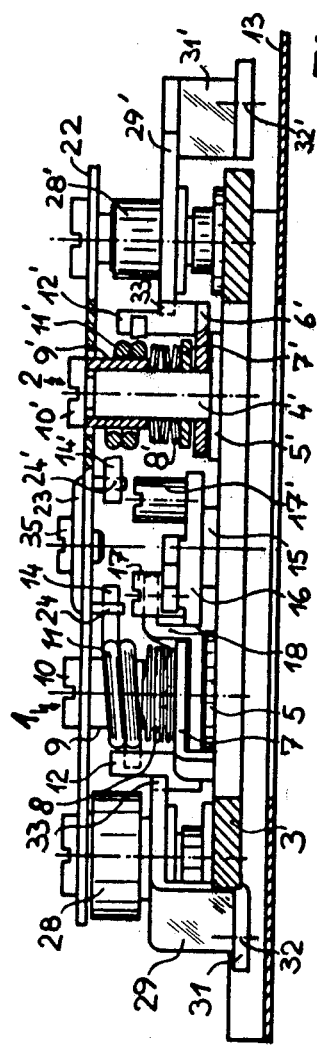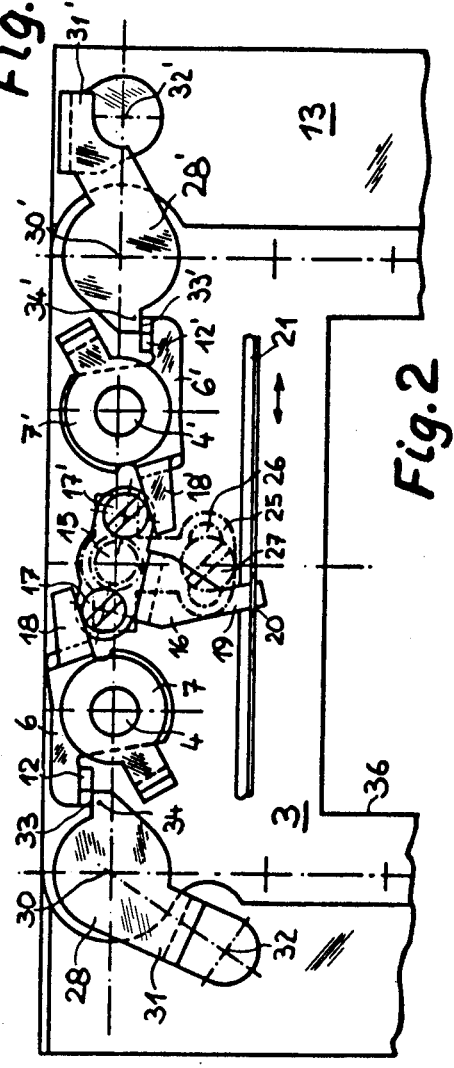

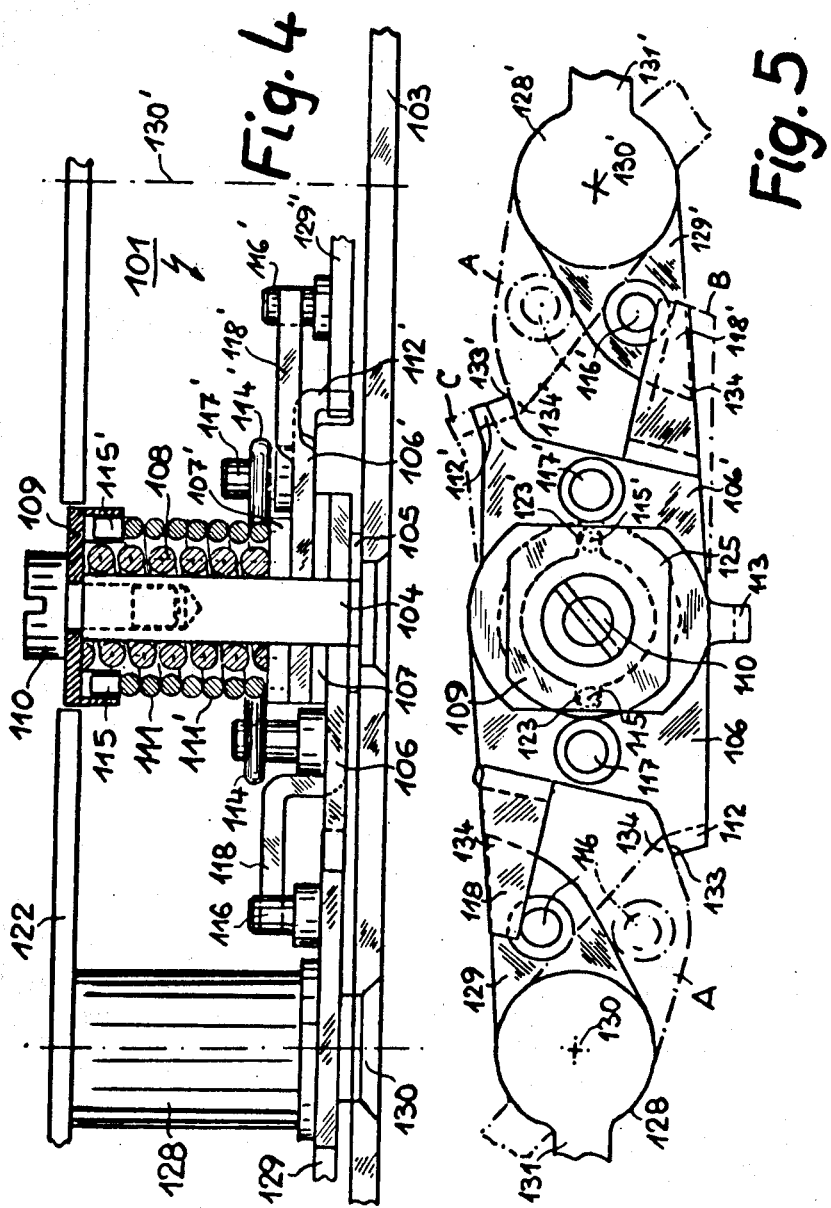

BRAKE SYSTEM FOR FOCAL PLANE SHUTTERS OF PHOTOGRAPHIC CAMERAS

BACKGROUND OF THE INVENTION

The invention applies to a system for braking the moving elements of a focal plane shutter for a photographic camera, with the braking system becoming effective just before the moving elements reach their stop or end position. Such focal plane shutters usually have thin and lightweight metal blades that are combined in an overlapping arrangement to form a shutter curtain, and the shutter can include one element that moves to open the shutter and another element that moves to close the shutter. Such moving shutter parts require considerable spring force in spite of their relatively small mass and inertia, and the spring forces have to be effective over the entire extent of the picture window throughout the entire distance of travel of the shutter elements to make the slot speed exact throughout its distance of travel. This requires braking of a considerable amount of energy as the shutter elements approach their stop positions, and the braking force is relatively abrupt in stopping the shutter elements.

Brake systems for abrupt stopping of shutter elements moving at the focal plane are generally known. Among others, it is already shown in German Pat. No. 1,090,508, issued Mar. 23, 1961, to brake the moving elements of a focal plane shutter by a belt brake that is similar to a drum brake. Such a belt brake applies a predetermined brake torque to a brake drum that is operatively connected with shutter curtain parts in a coupling that includes a coil spring, an engaging drum, and a forked lever. The coupling mechanism only operates in one direction, as a known coil spring coupling and transmits brake torque of the drum brake to the shutter curtain during braking operations and then uncouples the brake spring of the drum brake to prevent unreasonably high shutter cocking forces. Such an arrangement requires relatively complex coupling devices, and its coupling coil spring is subject to variations in slip that are changed by external influences so that it is not completely reliable and also occupies considerable space.

The invention involves recognition of the problems of prior art braking systems for focal plane seutters and a realization of a way of providing a braking system that operates reliably and effectively and also gently and smoothly in braking the moving elements of a focal plane shutter without causing any bumpings or vibrations. The invention also combines these virtues with a compact brake system that requires little space, is simple, efficient, and effective, and provides a braking torque that is conveniently adjustable and capable of accurately establishing the end or stop positions of the shutter elements (blade overstroke).

SUMMARY OF THE INVENTION

The inventive braking system applies to a focal plane shutter for a photographic camera and is effective just before moving elements of the shutter reach their end or stop positions. The braking torque is divided into two components provided by first and second brake elements. The first brake element has a nearly constant braking torque throughout the braking portion of the movement of the shutter elements, and a second brake element has a braking torque that increases during the braking portion of the movement. The constant and the increasing braking torques are combined, and these torques are adjusted and set for the first and second brake elements independently of each other. One advantage of such an arrangement is that the braking torque initially applied to the shutter elements is soft or gentle and rapidly and smoothly increases substantially so as to bring the shutter elements to a rapid but firm stop during the final portion of their travel without affecting slot speed within the picture window. It is then possible to fix the end or stop position for the shutter elements with a very small overstroke without using any mechanical stop and to avoid any bump or vibration and also protect the extremely thin and delicate metal elements of the shutter. The inventive braking system is also compact and advantageously fits in a small space next to the narrow side of the camera film plane, and dividing the braking torque into two components contributes considerably to the compactness of the inventive braking system.

BRIEF DESCRIPTION OF THE DRAWINGS

FIG. 1 is a partially cross-sectioned, side elevational view of one preferred embodiment of the inventive brake system shown in braking position;

FIG. 2 is a plan view of the brake system of FIG. 1;

FIG. 4 is a partially cross-sectioned, side elevational view of another embodiment of the inventive brake system shown in braking position;

FIG. 5 is a fragmentary plan view of the brake system of FIG. 4;

DESCRIPTION OF THE PREFERRED EMBODIMENT

Figure 3:
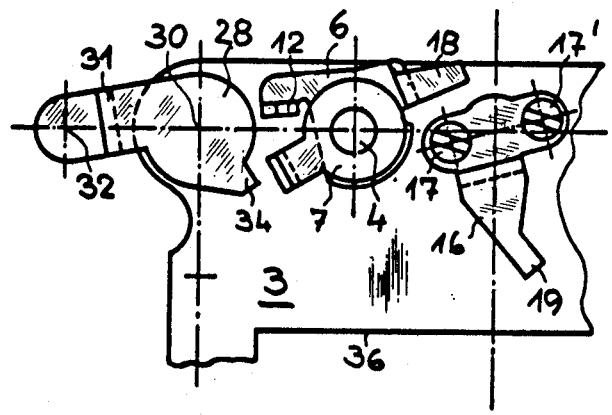
FIG. 3 is a fragmentary plan view of the left end of the brake system of FIG. 1 showing some of the brake components in the cocked-shutter position.

In the brake system shown in FIGS. 1 and 2, a pair of brake blocks or devices 1 and 2 are arranged beside each other on a shutter plate 3. The respective component parts of each brake device are fitted on a pair of shafts or bearing pins 4, 4' secured to the plate 3. The corresponding elements of each of the brake units 1 and 2 are identified with corresponding primed and unprimed numbers. The components of the brake blocks or devices 1 and 2 include a washer 5, 5', a brake lever 6, 6', and a slide or friction washer 7, 7' having a bent-over leg fitting into an aperture in the plate 3 to be secured against rotation. A first brake element for each unit is formed as several dished springs 8, 8' that are pressed under spring stress against the brake levers 6, 6' by a clamping ring or sleeve 9, 9' that is held in place by a clamping screw 10, 10' that can be screwed axially into the bearing pin 4, 4'. The second brake element is formed as a helical spring 11, 11' wound around the clamping sleeve 9, 9'. To the right and left of the brake blocks 1 and 2 is arranged a shutter drive system 28, 28' for driving the moving shutter elements. Between the brake units is arranged a device for returning the brake levers 6, 6' to a starting position and an adjusting device for the helical springs 11, 11', and all these parts are mounted on the shutter plate 3.

The return device for the brake levers 6, 6' consists of a setting lever 16 that is rotatably mounted on the pivot 15. Two pins 17, 17' on the setting lever 16 cooperate respectively with arms 18, 18' of the brake levers 6, 6'. A protruding arm 19 of the setting lever 16 is directed approximately perpendicularly away from the pins 17, 17' and engages a slot 20 in a return slider 21. The return slider 21 is arranged for longitudinal movement as indicated by the arrow simultaneously with the shutter-cocking mechanism (not shown).

Above the return device in a cover plate 22 covering the shutter assembly as shown in FIG. 1, is an adjusting device for the adjustment of the second brake elements consisting of the helical springs 11, 11' to provide increasing brake torque. The adjusting device is shown in broken lines in FIG. 2 to distinguish it from the return device located underneath the adjusting device. The adjusting device includes a setting bar 23 having downwardly bent legs 24, 24' extending through respective slots in the cover plate 22 and rotatably mounted on a rotationally settable pivot 35 concentric with the pivot 15 of the return device. The adjusting device includes a lever 25 having a slot 26 that allows the lever 25 to be pivoted radially by a small amount and held in a selected position by a set screw 27 screwed into the cover plate 22. The free ends 14, 14' of the helical springs 11, 11' bear against the bent-down legs 24, 24' that pass through the cover plate 22, and the opposite ends of the helical springs 11, 11' bear against upwardly bent legs 12, 12' of the brake levers 6, 6' under a predetermined spring stress that is set by the angular position of the lever 25.

The brake system 1-27, which is self contained and compact in assembly and function, cooperates simply through the legs 12, 12' of the brake levers 6, 6' with the shutter drives 28, 28' of the two moving elements of the shutter. This connection is provided by a brake link 29, 29' for each of the shutter drives 28, 28'. The brake links 29, 29' together with the other movable components (not shown) of the drives, are mounted rotatably on drive bearings 30, 30'. The brake links 29, 29' also include lever arms 31, 31' that are coupled to the exterior of the brake system and have different shapes to accommodate shutter-cocking elements and the actuation of the shutter elements (which are not illustrated for the sake of clarity). The lever arms 31, 31' engage the bearing points 32, 32' of the shutter elements. The brake links 29, 29' each have abutments or noses 34, 34' protruding into the brake system and contacting the brake levers 6, 6' at the points 33, 33'.

FIGS. 1 and 2 show all the movable components in the braked end or stop position, and the same components are shown in the positions assumed before a shutter release in FIG. 3 for the left side of the system as shown in FIG. 2.

As the shutter is cocked with the film winding lever externally of the camera, the lever arm 31, 31' is pivoted in the clockwise direction, and the shutter drive 28, 28' is cocked. The return slider 21 for the brake units 1 and 2 is also shifted to the left as the cocking movement of the lever arms 31, 31' occurs. This pivots the setting lever 19 in the clockwise direction about its pivot 15, and this moves the pins 17, 17' against the projections or legs 18, 18' of the brake levers 6, 6' to pivot the brake levers 6, 6' out of the position shown in FIGS. 1 and 2 and into the starting or readiness position shown in FIG. 3 after counterclockwise rotation around the shafts 4, 4'. The noses or abutments 34, 34' of the brake links 29 29' are moved away from the contact points 33, 33' and relatively far away from the bent-up legs 12, 12' of the brake levers 6, 6' which continue rotating somewhat after this separation has occurred.

When the shutter is released, its elements move without any braking effect across the length of the shutter window 36, and the total braking torque is applied to the moving shutter elements just before they reach their end or stop positions. This braking force is divided into two individual moments provided by the first brake elements 8, 8' and the second brake elements 11, 11'.

The first brake elements 8, 8' provide a constant brake torque or moment resulting from the frictional engagement between the dished springs 8, 8', the fixed friction washers 7, 7', the clamping ring or sleeve 9, 9', and the washers 5, 5'. The dished springs 8, 8' alone would provide sufficient braking moment or torque only if plenty of space were available in the camera for a longer distance of travel of the movable shutter elements. So an additional and increasing brake moment is provided by the second brake elements formed as the helical springs 11, 11', and this is arranged in a compact way by winding the springs 11, 11' around the periphery of the clamping sleeve 9, 9'. The ends of the springs 11, 11' apply a basic initial stress against their directions of winding between the downwardly bent legs 24, 24' of the adjusting bar 23 and the outermost points of the brake levers 6, 6' provided by the upwardly bent legs 12, 12'.

The helical springs 11, 11' generate an increasing spring force and a likewise increasing brake moment between the spring end engagement points and rotate the brake levers 6, 6' clockwise. The increasing brake moment provided by the springs 11, 11' is added to the constant brake moment provided by the dished springs 8, 8' to result in a total brake moment that increases over the distance that the braking is applied.

The two brake moments can be separately and independently adjusted. The clamping screw 10, 10' adjusts the axial position of the clamping ring or sleeve 9, 9' to establish the amount of the constant brake moment provided by the dished springs 8, 8', and the pivoting of the setting bar 23 after loosening the screw 35 adjusts and sets the variable increasing stress of the helical springs 11, 11'. Both springs in common can be adjusted to change the starting point for application of the braking moment, and the helical springs 11, 11' can additionally vary the rate of increase of the braking moment.

Another advantage of the inventive arrangement of the second brake elements as the helical springs 11, 11' is that the springs expand as the shutter is cocked with the film winding lever to return the brake system from the braked position so that the springs 11, 11' produce decreasing spring moment to reduce the moment required as the movement proceeds for noticeably reducing the cocking force required on the film winding lever as the cocking motion proceeds toward completion. The brake moment of the dished springs 8, 8' remains constant during the cocking motion.

FIGS. 4 and 5 show another preferred embodiment of the inventive brake system having similar components identified by corresponding numbers larger by 100 than the numbers used in referring to the components of the embodiment of FIGS. 1 and 2. The embodiment of FIGS. 4 and 5 is made even more compact than the embodiment of FIGS. 1 and 2 by combining the two brake units 1 and 2 into a single brake unit 101 arranged to act upon both moving elements of the shutter.

A single bearing pin or shaft 104 is mounted on the shutter plate 103, and the brake components are movable about the pin 104. Lowermost above the plate 103 is a washer 105 formed of a slidable or friction material. Above this is a forked brake lever 106 directed toward the left, another friction washer 107, a forked lever 106' directed toward the right, and another friction washer 107' that is secured against rotation by a downwardly bent leg 113 extending into an opening in the plate 103. These parts are pressed together by a helical compression spring 108 bearing against a clamping plate 109 and serving as the first brake element providing a constant spring force generating a constant friction moment between the washers 107, 107', the forked brake levers 106, 106', and the washer 105 above the plate 103. The clamping plate 109 is axially adjustable by a clamping screw 110 screwed into the shaft 104 for adjusting the compression spring force of the brake element 108.

In addition to the constant brake moment provided by the spring 108, increasing brake moments are provided by a compact arrangement of a pair of helical torsion springs 111, 111' wound in with one another around the spring 108. An eye 114, 114' formed at the lower end of each of the springs 111, 111' is wrapped around an engaging pin 117, 117' secured to the forked brake levers 106, 106'. The opposite upper ends 115, 115' of springs 111, 111' are bent upwards and retained in notches 123, 123' formed in the underside of the clamping plate 109. The notches 123, 123' provide for adjustment in the tension of the second brake elements 111, 111' by rotationally setting the clamping plate 109. The radial or rotational adjustment of the plate 109 for adjustably tensioning the springs 111, 111' is held fast in the desired radial position while axial adjustment of the first brake element 108 is provided by the clamping screw 110.

The brake system shown in FIGS. 4 and 5 accomplishes braking of the shutter elements by the forked brake levers 106, 106' having bifurcated or forked legs 112, 112' and 118, 118' between which pins 116, 116' of the brake links 129, 129' of the shutter drives 128, 128' extend. The forked brake levers 106, 106' are mounted one above the other at different levels on the bearing pin 104 and are shaped to reach a uniform level relative to the pins 116, 116' on the brake links 129, 129' as best shown in FIG. 4. On the left side of FIG. 4, the short fork leg 112 of the lowermost brake lever 106 is already at the same level with the brake link 129 for proper engagement, and the long fork leg 118 is bent upward and rests against the return pin 116 of the brake link 129. On the right side of FIG. 4, the short fork leg 112' of the forked brake lever 106' is relatively higher by the thickness of the washer 107 and is bent downward so that the brake link 129' can engage the short fork leg 112'. The long fork leg 118' is bent a little upward so that it rests against the return pin 116' at the same level with the leg 118.

The embodiment of FIGS. 4 and 5 operates to brake the shutter elements smoothly and forcibly without jolts or bumps shortly before their end or stop positions are reached, and the brake forces are transmitted from the forked levers 106, 106' to the brake links 129, 129'. The braking force is divided into a constant moment provided by the first braking element 108 and an increasing braking moment provided by the springs 111, 111' according to the same principles previously described, and the assembly is made more compact. Otherwise, an operational difference exists in that the brake links 129, 129' not only accomplish braking of the shutter elements, but also return the brake system to its initial position of brake readiness during the cocking of the shutter. The way this takes place is shown at the right side of FIG. 5. The solid-line positions of the fork legs 112' and 118' and the brake link 129' are positioned where the brake link 129' with its return pin 116' has reached a position engaging the long fork leg 118'. On further movement of the cocking lever of the camera, these parts move to the position B indicated by dot-dash lines to establish the initial position for the braking readiness of the brake system.

Upon release of the shutter and the running of the shutter drive, the brake link 129, 129' pivots about the drive bearing 130, 130' in the clockwise direction. During this movement, the nose 134, 134', shortly before the illustrated position, engages the short fork leg 112, 112' at the contact point 133, 133' and pivots the brake levers 106, 106' to the C position shown in dot-dash lines. This produces a total brake moment that increases in torque by combining the constant brake moment of the spring 108 with the increasing brake moment of the springs 111, 111'.

The embodiment of FIG. 4 is more compact in combining brake elements and levers on a single pivot shaft 104 and combining both brake element adjusting means into a single clamping plate 109 to conserve on space, but the embodiment of FIGS. 1 and 2, although somewhat more expensive, permits more exact adjustment for each individual brake element.

Figure 6:
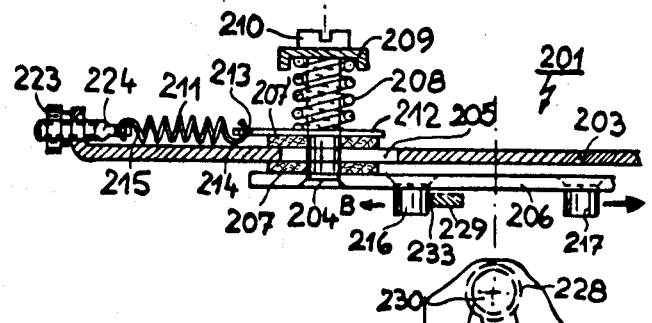
FIG. 6 is a partially cross-sectioned, side elevational view of another embodiment of the inventive brake system.
Figure 7:
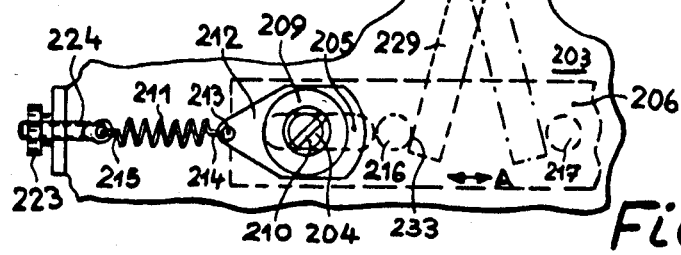
FIG. 7 is a fragmentary plan view of the brake system of FIG. 6.

A third preferred embodiment is shown in FIGS. 6 and 7 and operates according to the same principle of combining separate components of braking force, with the difference that its brake lever 206 operates in a longitudinal direction of action. For simplicity, only those parts are illustrated that are necessary for understanding the working of the combined brake forces, with all unnecessary parts omitted. The reference numerals for corresponding components are increased by 100 from the embodiment of FIGS. 4 and 5 and by 200 from the embodiment of FIGS. 1-3. Also, only one side of a brake unit is shown in FIGS. 6 and 7, for braking one of the shutter elements, because the other side of the brake system for braking the other shutter element nearly duplicates what is illustrated.

A plate 203 supports the brake system, which includes an elongated brake lever 206 longitudinally movable in a slot 205 and supported beneath the plate 203 by means of a bearing pin or shaft 204. A slide or friction washer 207 is arranged between the brake lever 206 and the underside of the plate 203, and another slide or friction washer 207' is arranged on the upper side of plate 203 between the plate 203 and a draw plate 212. The draw plate 212 provides the lower bearing surface for a helical compression spring 208 serving as the first brake element applying a constant brake force. The counter bearing of the helical compression spring 208 is formed by a clamping plate 209 that is adjustable axially of the pin 204 and secured in place by a clamping screw 210 threaded into the pin 204. These components provide the constant brake force as the brake element 208 presses the washers 207, 207' against opposite surfaces of the plate 203.

The brake lever 206 is longitudinally movable in the direction of the arrows to accomplish its braking and reset movements, and its braking movement is resisted by a tension spring 211 hooked into a hole 213 of the draw plate 212 and having its opposite spring end 215 hooked to an adjustably threaded pin 224 secured by a lock nut 223. The spring 211 serves as the second braking element providing the increasing brake force that is combined with the constant brake force from spring 208 for smooth and forceful braking of the shutter elements. Also, the brake force in the return of the brake lever during shutter cocking reduces substantially before the brake lever 206 reaches its initial brake readiness position to reduce the force required during the final portion of the movement of the camera cocking lever.

The brake lever 206 cooperates with a brake link lever 229 that is pivotal as shown by arrow A in FIG. 7 about the drive bearing 230 of the shutter drive 228 by the simple arrangement of two pins 216 and 217 carried by the brake lever 206. The brake link 229 can move freely in a pivoting manner between the pins 216 and 217 during the running of the shutter drive 228. The brake lever 206 moves in the direction C (FIG. 6) during braking as the brake link 229 engages the pin 217. On return of the brake system during cocking of the shutter, the brake link 229 engages the return pin 216 at the point 233 and moves the brake lever 206 back in the direction B (FIG. 6).

All three of the preferred embodiments illustrated and described above do not require any fixed stop for the braked or stopped end position of the shutter elements so that the "click" typical of photographic shutters becomes nearly inaudible. The braking of the shutter elements begins on the last few millimeters of the picture aperture 36 of the picture frame and comes to a halt without any impact against the stop in the braked end position directly beyond the edge of the picture aperture 36. In this position the shutter elements consisting of very thin metal plates and their suspensions on the lever arms 31, 31' complete their stopping movements in a shutter overstroke that permits the shutter elements to stop smoothly without engaging an abutment.

What is claimed is:

1. A focal plane shutter for a photographic camera having a brake system for braking the movement of elements of said shutter, said braking system being effective during a braking portion of said movement of said elements, said braking portion occurring just before said shutter elements reach their stop positions, and said braking system being characterized by the fact that:
   a. at least one first brake element having a nearly constant braking torque throughout said braking portion of said movement;
   b. at least one second brake element having a braking torque that increases over said braking portion of said movement;
   c. means for combining said constant and increasing braking torques of said first and second brake elements; and
   d. means for adjusting and setting said constant and increasing braking torques of said first and second brake elements independently of each other.

2. The shutter of claim 1 wherein said first and second brake elements are combined by being arranged in a single brake device.

3. The shutter of claim 1 including a shutter element for opening and a shutter element for closing, and further characterized by the fact that one of said brake devices is arranged to brake each respective one of said opening and closing elements.

4. The shutter of claim 3 wherein said brake devices are spatially separated, and a separate brake lever is operated by each of said devices.

5. The shutter of claim 3 wherein said shutter includes a mounting plate, and said brake devices and a pair of respective brake levers operated by said brake devices are arranged on a shaft secured to said mounting plate.

6. The shutter of claim 5 including washers arranged on said shaft and wherein said brake levers are rotatable between said washers.

7. The shutter of claim 5 including means for axially adjusting said first brake element relative to said shaft for adjusting said constant torque of said first brake element.

8. The shutter of claim 5 including a radially adjustable device and wherein said second brake elements are formed as helical springs arranged to brake by turning against their direction of winding, and ends of said helical springs engage said adjusting device for adjusting said increasing torque of said second brake elements.

9. The shutter of claim 3 including a brake lever operated by each of said brake devices and wherein said brake levers are formed with bifurcated ends for applying said combined braking torque to said shutter elements.

10. The shutter of claim 9 including brake guiding devices disposed between said bifurcated brake lever ends to move said brake levers to a starting position in response to cocking motion of said shutter, said brakes being ineffective in said starting position.

11. The shutter of claim 9 including a brake reset lever engaging said brake levers so as to reset said brake levers to a starting position in response to cocking motion of said shutter, said brakes being ineffective in said starting position.

12. The shutter of claim 3 including a shutter mounting plate, a brake lever arranged to be slidable relative to said plate, a pair of disks movable with said brake lever and pressed against opposite face surfaces of said plate, said first brake element being arranged as a helical spring for pressing said disks against said shutter plate, and said second brake element being formed as an adjustably tensioned spring resisting movement of said brake lever in the braking direction.

13. The shutter of claim 1 wherein said first brake element comprises at least one dished spring and means for pressing said dished spring against a relatively rotating surface.

14. The shutter of claim 1 wherein said first brake element is formed as a helical spring arranged to press against a relatively rotating surface.

15. The shutter of claim 1 wherein said second brake element is formed as a helical spring arranged to brake by turning against its direction of winding.

* * * * *